(12) United States Patent
Nyang

(10) Patent No.: US 9,231,757 B2
(45) Date of Patent: Jan. 5, 2016

(54) PROXY SIGNATURE SCHEME

(71) Applicant: Inha-Industry Partnership Institute, Incheon (KR)

(72) Inventor: DaeHun Nyang, Seoul (KR)

(73) Assignee: INHA-INDUSTRY PARTNERSHIP INSTITUTE, Incheon (KR)

( * ) Notice: Subject to any disclaimer, the term of this patent is extended or adjusted under 35 U.S.C. 154(b) by 100 days.

(21) Appl. No.: 14/110,614

(22) PCT Filed: Dec. 5, 2012

(86) PCT No.: PCT/KR2012/010485
§ 371 (c)(1),
(2) Date: Oct. 8, 2013

(87) PCT Pub. No.: WO2014/088130
PCT Pub. Date: Jun. 12, 2014

(65) Prior Publication Data
US 2014/0211943 A1    Jul. 31, 2014

(51) Int. Cl.
*H04L 9/08*    (2006.01)
*H04L 9/32*    (2006.01)

(52) U.S. Cl.
CPC ............ *H04L 9/0819* (2013.01); *H04L 9/0861* (2013.01); *H04L 9/3249* (2013.01); *H04L 2209/76* (2013.01)

(58) Field of Classification Search
CPC . H04L 9/0819; H04L 2209/76; H04L 9/3249; H04L 9/0861
See application file for complete search history.

(56) References Cited

U.S. PATENT DOCUMENTS

| | | | | |
|---|---|---|---|---|
| 5,214,702 A * | 5/1993 | Fischer | | 380/30 |
| 6,307,936 B1 * | 10/2001 | Ober et al. | | 380/30 |
| 7,505,584 B2 * | 3/2009 | Kamibayashi et al. | | 380/22 |
| 7,925,027 B2 * | 4/2011 | Kempf et al. | | 380/282 |
| 8,086,859 B2 * | 12/2011 | Pavlicic | | 713/176 |
| 8,873,754 B2 * | 10/2014 | Xu et al. | | 380/255 |
| 8,929,521 B2 * | 1/2015 | Beyer et al. | | 379/93.02 |
| 2005/0005126 A1 * | 1/2005 | Zhang et al. | | 713/176 |
| 2005/0022102 A1 * | 1/2005 | Gentry | | 715/500 |
| 2005/0157881 A1 * | 7/2005 | Van Someren | | 380/286 |
| 2006/0239452 A1 | 10/2006 | Jung | | |
| 2008/0126801 A1 * | 5/2008 | Lee et al. | | 713/167 |
| 2009/0013177 A1 * | 1/2009 | Lee et al. | | 713/158 |

(Continued)

FOREIGN PATENT DOCUMENTS

EP    1926278 A1    5/2008

OTHER PUBLICATIONS

Public-Key Encryption by RSA Algorithm, Jun. 28, 2010, pp. 1-3.*

(Continued)

*Primary Examiner* — Kaveh Abrishamkar
*Assistant Examiner* — James J Wilcox
(74) *Attorney, Agent, or Firm* — Brundidge & Stanger, P.C.

(57) ABSTRACT

Technologies are generally described for proxy key generation, and signature generation and validation. In some examples, a cryptographic key generation system may include an original key generation unit configured to generate a public key and a private key for an original signer, a proxy key generation unit configured to generate one or more proxy public keys and one or more proxy private keys for one or more proxy signers, and a transmitter configured to transmit the proxy private keys respectively to the one or more proxy signers.

17 Claims, 4 Drawing Sheets

(56) References Cited

U.S. PATENT DOCUMENTS

| 2009/0150982 | A1* | 6/2009 | Kim | 726/5 |
| 2009/0208000 | A1* | 8/2009 | Yoshioka | 380/42 |
| 2010/0293370 | A1 | 11/2010 | Xiao | |
| 2012/0323981 | A1* | 12/2012 | Yamamoto et al. | 708/250 |
| 2013/0086378 | A1* | 4/2013 | Yao et al. | 713/156 |

OTHER PUBLICATIONS

Massey, Logarithms in Finite Cyclic Groups-Crytographic Issues, Preprint of Paper to be presented at 4th Symp. on Info. Th. in Benelux, Hassrode, Belgium, May 26-27, 1983, pp. 1-9.*
Mehta, Efficient One-Time Proxy Signatures, IEE. Proc-Commun., vol. 152, No. 2, Apr. 2005, pp. 1-5.*
GNU Privacy Handbook, "Key Management," Nov. 3, 2011 pp. 1-5.*
Cooper, "Internet X.509 Public Key Infrastructure Certificate and Certificate Revocation List (CRL) Profile," May 2008, pp. 1-151.*
Microsoft, "Renew a Certificate," Sep. 6, 2009, pp. 1-2.*
Massey, Logarithms in Finite Cyclic Groups-Cryptographic Issues, Preprint of Paper to be presented at $4^{th}$ Symp. on Info. Th. in Benelux, Hassrode, Belgium, May 26-27, 1983, pp. 1-9.*
Interview Summary Attached, Paper No: 20150921.*
International Search Reprot from Corresponding International Application No. PCT/KR12/010485 mailed Dec. 5, 2012.
"An RSA-Based(t,n) Threshold Proxy Signature Scheme without andy Trusted Combiner" by P. Ting, et al. ISC '09 Proceedings of the 11th International Conference on Information Security pp. 277-284.
"Construction of Efficient Authentication Schemes Using Trapdoor Hash Functins" by S. Chandrasekhar., 2011.
"A Secure Proxy-Protected Signature Scheme Based on the Strong RSA Assumption" by A. Naji, et al., vol. 41, No. 2, 2010, pp. 194-201.
Comments on "A partical (t,n) Threshold Proxy Signature Scheme Based on the RSA Cryptosystem" by G. Wang, et al., IEEE Transactions on Knowledge and Data Engineering, vol. 16, No. 10, Oct. 2004, pgs.
"Symmetric Identity-proving Protocol for Smart Cards", Nyang et al., Electronics Letters, 1999, vol. 35, No. 23.
"A Practical (t,n) Threshold Proxy Signature Scheme Based on the RSA Cryptosystem" by Hwang, et al., 2003, IEEE Transactions on Knowledge and Data Engineering, vol. 15, No. 6, Nov./Dec. 2003.
"Certificate Issuing Using Proxy and Threshold Signatures in Self-initialized Ad Hoc Network" by J. Kang, et al, 2007.

* cited by examiner

PROXY SIGNATURE SCHEME

CROSS-REFERENCE TO RELATED APPLICATIONS

This Application is the National Stage filing under 35 U.S.C. §371 of PCT Application Ser. No. PCT/KR2012/010485 filed on Dec. 5, 2012. The disclosure of the PCT Application is hereby incorporated herein by reference in its entirety.

BACKGROUND ART

An RSA algorithm for public-key cryptography has been widely used since it was introduced by R. L. Rivest, A. Shamir, and L. Adleman in late 1970s. The RSA algorithm involves a public key and a private key. The public key can be known to everyone and then used for encrypting messages. The messages encrypted with the public key can only be decrypted using the private key.

One of the applications of the RSA algorithm is a digital signature scheme. The digital signature scheme typically involves three algorithms: a key generation algorithm, a signing algorithm, and a signature verifying algorithm. First, according to the key generation algorithm, a signer selects a private key and a corresponding public key. Second, according to the signing algorithm, the signer produces a signature, given a message and the private key. Lastly, according to the signature verifying algorithm, a verifier either accepts or rejects the message's claim to authenticity, given the message, the public key and the signature.

DISCLOSURE OF INVENTION

In an example, a cryptographic key generation system may include an original key generation unit configured to generate a public key and a private key for an original signer, the private key including two distinct prime numbers, and the public key including a generator of a subgroup of a finite cyclic group of an order of product of the two distinct prime numbers; a proxy key generation unit configured to generate one or more proxy public keys and one or more proxy private keys for one or more proxy signers, based at least in part on warrants to be given respectively to the one or more proxy signers and the generator of the subgroup included in the public key generated by the original key generation unit; and a transmitter configured to transmit the proxy private keys respectively to the one or more proxy signers.

In another example, a method performed under control of an original signer for a proxy signer to sign on behalf of the original signer, may include selecting a private key and a public key for the original signer, wherein the private key includes two distinct prime numbers, and the public key includes a generator of a subgroup of a finite cyclic group of an order of product of the two distinct prime numbers; computing a proxy public key for the proxy signer based at least in part on a warrant to be given to the proxy signer; computing a proxy private key for the proxy signer based at least in part on the generator of the subgroup included in the public key and the computed proxy public key; and transmitting the computed proxy private key to the proxy signer.

In yet another example, a computer-readable storage medium may store thereon computer-executable instructions that, in response to execution, cause a cryptographic key generation system to perform operations, including selecting a private key and a public key for an original signer, wherein the private key includes two distinct prime numbers, and the public key includes a generator of a subgroup of a finite cyclic group of an order of product of the two distinct prime numbers; computing a proxy public key for a proxy signer based at least in part on a warrant to be given to a proxy signer; and computing a proxy private key for the proxy signer based at least in part on the generator of the subgroup included in the public key and the computed proxy public key.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

MODE FOR THE INVENTION

Figure 1:
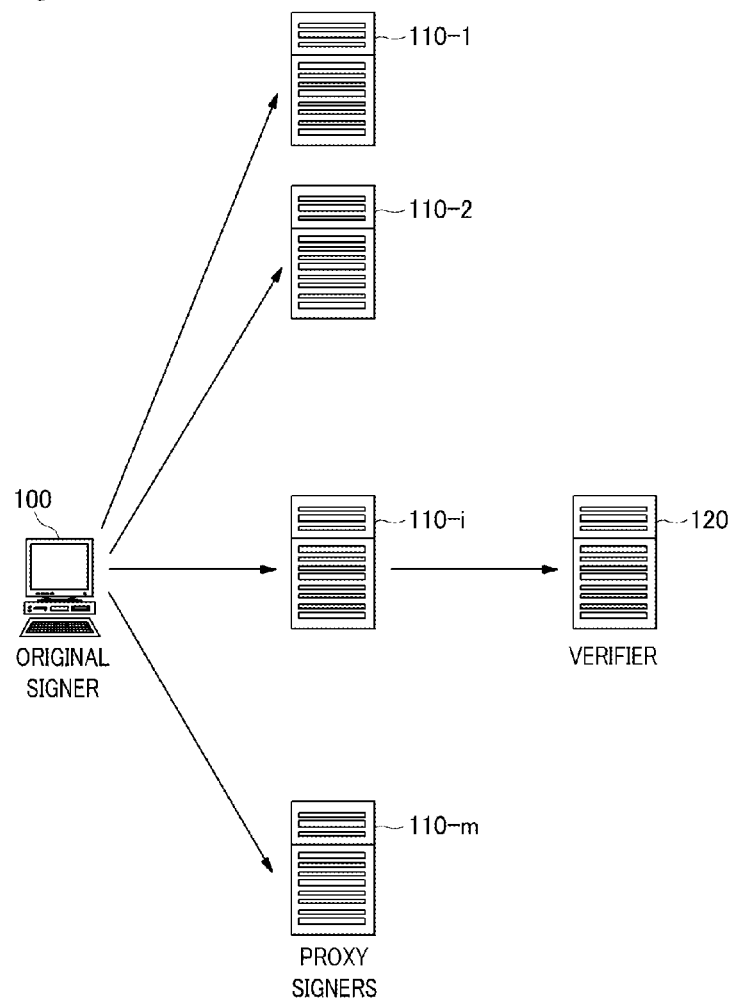
FIG. 1 schematically shows an illustrative example of an environment in which an original signer delegates its signing capability to one or more proxy signers, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a proxy signature scheme. Further, technologies are herein generally described for proxy key generation, and signature generation and validation.

In some examples, an original signer (i.e., a user's device) may generate one or more proxy private keys respectively for one or more proxy signers (i.e., proxy servers), then transmit the generated proxy private keys to the respective proxy signers. The proxy signers may respectively store the received proxy private keys. Then, when the original signer desires to sign a message, the original signer may access one of the proxy signers, and have the corresponding proxy signer sign the message on behalf of the original signer using the proxy private key.

In some examples, the original signer may generate different proxy private keys for different proxy signers. That is, the original signer may divide its signing capability amongst the one or more proxy signers. In such cases, if one of the one or more proxy signers is hacked, the signing capability of the original signer is not entirely compromised. Instead, compromised capabilities are limited to just the hacked proxy signer.

The proxy signature scheme in accordance with at least some embodiments described herein may include a key generation process performed by the original signer, a proxy key generation process performed by the original signer, a proxy signing process performed by one of the proxy signers, a proxy verification process performed by a verifier, and a revocation process performed by the original signer.

According to the key generation process, the original signer may generate a public key and a private key. The public key and the private key for the original signer may respectively include an RSA-based public key and an RSA-based private key. That is, the public key for the original signer may include a product "n" of two distinct prime numbers, i.e., n=p*q, and a generator "g" of a subgroup of a finite cyclic group of an order of n. The private key for the original signer may include the two distinct prime numbers "p" and "q."

According to the proxy key generation process, the original signer may generate one or more proxy public keys and one or more proxy private keys for the one or more proxy signers, based at least in part on the generator g and warrants to be given respectively to the one or more proxy signers. By way of example, but not limitation, the warrant to be given to the respective one of the proxy signers may include an identity of the original signer (i.e., information regarding the original signer itself), an identity of the respective one of the proxy signers (i.e., information regarding the respective one of the proxy signers), an expiration date until which the respective one of the proxy signers is able to sign, and/or a qualification of message on which the respective one of the proxy signers is able to sign. Then, the original signer may transmit the proxy private keys respectively to the one or more proxy signers, and publicly disclose the public key for the original signer and the proxy public keys by requesting a certificate authority (CA) to generate a certificate for the original signer including the public key for the original signer and the proxy public keys. The certificate for the original signer may include the public key for the original signer and the proxy public keys, so that the verifier may use the public key for the original signer and the proxy public keys included in the certificate for the original signer during the proxy verification process.

According to the proxy signing process, the one of the proxy signers may generate a proxy signature of a message using the proxy private key, which was received from the original signer and is stored in the corresponding proxy signer, as well as its own RSA-based private key.

According to the proxy verification process, the verifier may verify the proxy signature and the message using at least the certificate for the original signer generated by the certificate authority (CA).

According to the revocation process, if one or more of the proxy signers is hacked, the original signer may update or change the generator g to g'. Then, the original signer may update the proxy private keys, respectively, for the one or more proxy signers except for the hacked one of the proxy signers, based at least in part on the updated generator g'. The updated proxy private keys may then be transmitted, respectively, to the one or more proxy signers, except for the hacked one of the proxy signers. In such cases, the verifier may not have to manage a proxy key revocation list.

FIG. 1 schematically shows an illustrative example of an environment in which an original signer 100 delegates its signing capability to one or more proxy signers 110-1, 110-2, ..., 110-$m$, arranged in accordance with at least some embodiments described herein.

As depicted, original signer 100 may delegate its signing capability to proxy signers 110-1, 110-2, ..., 110-$m$, so that one of proxy signers 110-1, 110-2, ..., 110-$m$ may generate a proxy signature for a message M on behalf of original signer 100. A verifier 120 may verify the proxy signature generated by one of proxy signers 110-1, 110-2, ..., 110-$m$. By way of example, but not limitation, original signer 100 may be a user's device such as, for example, a smartphone, a mobile phone, a personal digital assistant (PDA), a tablet, a laptop computer, a desktop computer, etc. Each of proxy signers 110-1, 110-2, ..., 110-$m$ may be any one of a server, a server farm or a server cluster for proxy signing. Verifier 120 may be another user's device, or a server, a server farm or a server cluster for verifying the proxy signature generated by at least one of proxy signers 110-1, 110-2, ..., 110-$m$. Original signer 100, proxy signers 110-1, 110-2, ..., 110-$m$, and verifier 120 may communicate with one another via a network such as, for example, a wide area network (WAN), a metropolitan area network (MAN), a local area network (LAN), a campus area network (CAN), a virtual private network (VPN), etc. Although the below description describes for simplicity and ease of explanation that original signer 100, proxy signers 110-1, 110-2, ..., 110-$m$, and/or verifier 120 perform several operations and/or functions in accordance with at least some embodiments, those skilled in the art will recognize that a computer program or an application hosted by the respective entities may perform the operations and/or functions described herein.

In some embodiments, original signer 100 may select a private key (p, q, d) and a public key (n, e, g) for original signer 100, in which p and q are distinct random prime numbers, n is a product of p and q; e is a random integer which is smaller than $(p-1)(q-1)$ and relatively prime to $(p-1)(q-1)$; d is an integer multiplicative inverse of e, modulo $(p-1)(q-1)$; and g is a generator of a subgroup of a finite cyclic group of order n. That is, original signer 100 may select p, q, n, e and d based on an RSA key generation scheme, while selecting the generator g such that $g^k \equiv 1 \bmod n$ is satisfied, in which k is of the order of g mod n. By way of example, but not limitation, g may be no less than 160 bits, when n is 2048 bits.

In some embodiments, original signer 100 may then compute a proxy public key and a proxy private key for each of proxy signers 110-1, 110-2, ..., 110-$m$. For example, for proxy signer 110-$i$ among the one or more proxy signers, original signer 100 may compute the proxy public key $e_i = h(w_m, SN_i)$, in which h is a hash function, $w_m$ is a warrant to be given to proxy signer 110-$i$, and $SN_i$ is a random serial number. If the computed $e_i$ is not a prime number, original signer 100 may repeatedly compute $e_i$ with another serial number $SN_i$. Then, original signer 100 may compute $d_i$ such that $e_i * d_i \equiv 1 \bmod (p-1)(q-1)$. Then, original signer 100 may compute the proxy private key $s_i = g^{d_i}$.

By way of example, but not limitation, the warrant $w_m$ to be given to proxy signer 110-$i$ may include an identity of original signer 100, an identity of proxy signer 110-$i$, an expiration date until which proxy signer 110-$i$ is able to sign, and/or a qualification of message on which proxy signer 110-$i$ is able to sign, etc. The warrant may vary depending on the respective one of proxy signers 110-1, 110-2, . . . , 110-$m$.

Then, in some embodiments, original signer 100 may transmit the computed proxy private key $s_i$ to proxy signer 110-$i$, so that proxy signer 110-$i$ may use the proxy private key $s_i$ to sign the message M on behalf of original signer 100 and to generate the proxy signature. Further, original signer 100 may request a certificate authority (CA) (not shown) to generate a certificate for original signer 100 such that the certificate for original signer 100 may include the proxy public key $e_i$, as well as the public key (n, e, g) for the original signer. The certificate authority (CA) may be an entity that issues digital certificates including the certificate for original signer 100. By way of example, but not limitation, the certificate for original signer 100 may include the generator g in an extension field thereof. In some embodiments, verifier 120 may later use the certificate for original signer 100 to verify the proxy signature generated by proxy signer 110-$i$ on behalf of original signer 100.

In some embodiments, proxy signer 110-$i$ may select its own RSA-based private key ($p_i$, $q_i$, $dx_i$) and public key ($n_i$, $ex_i$). That is, proxy signer 110-$i$ may select two distinct random prime numbers $p_i$ and $q_i$, calculate $n_i=p_i*q_i$; select $ex_i$ as a random integer that is smaller than $(p_i-1)(q_i-1)$ and relatively prime to $(p_i-1)(q_i-1)$; and calculate $dx_i$ such that $ex_i*dx_i=1 \mod (p_i-1)(q_1-1)$. In this regard, proxy signer 110-$i$ may use both the proxy private key $s_i$ and its own RSA-based private key ($p_i$, $q_i$, $dx_i$) to generate the proxy signature. Further, proxy signer 110-$i$ may request the certificate authority (CA) to generate a certificate for proxy signer 110-$i$ such that the certificate for proxy signer 110-$i$ may include the public key ($n_i$, $ex_i$). Then, in some embodiments, verifier 120 may later use the certificate for proxy signer 110-$i$, as well as the certificate for original signer 100, to verify the proxy signature generated by proxy signer 110-$i$ on behalf of original signer 100.

In some embodiments, proxy signer 110-$i$ may generate the proxy signature for the message M by calculating $c=h(M, g^r \mod n)$, $y=rs_i^c \mod n$, and $z=c^{dxi} \mod n_i$, in which r is a random integer, (y, z) may be the proxy signature for the message M generated by proxy signer 110-$i$ on behalf of original signer 100.

In some embodiments, verifier 120 may verify the proxy signature (y, z) of the message M, using the public key for the original signer and the proxy public key included in the certificate for original signer 100 and/or the RSA-based public key included in the certificate for proxy signer 110-$i$. By way of example, but not limitation, verifier 120 may calculate $c'=z^{exi} \mod n_i$, and check whether $c'=h(M, y^{ei}g^{-c'})$. If $c'=h(M, y^{ei}g^{-c'})$, then verifier 120 may determine that the proxy signature (y, z) is valid. Otherwise, verifier 120 may determine that the proxy signature (y, z) is invalid.

In some embodiments, if it is determined that one or more of proxy signers 110-1, 110-2, . . . , 110-$m$ (e.g., proxy signer 110-$j$) has been hacked, original signer 100 may update the generator g to another generator g' of the subgroup of the finite cyclic group of order n. Original signer 100 may select the updated generator g' such that $g'^k \equiv 1 \mod n$ is satisfied, in which k is of the order of g' mod n. Then, original signer 100 may generate new proxy private keys for other proxy signers than hacked proxy signer 110-$j$. For example, original signer 100 may generate a new proxy private key $s_i'=g'^{di}$ For proxy signer 110-$i$, and transmit the new proxy private key $s_i'$ to proxy signer 110-$i$. Further, original signer 100 may request the certificate authority (CA) to update the certificate for original signer 100 by substituting g with g'.

Then, in some embodiments, verifier 120 may use the updated certificate for original signer 100 to verify the proxy signature generated by proxy signer 110-$i$ on behalf of original signer 100. Since the proxy private key of hacked proxy signer 110-$j$ has not been updated (i.e., still based on the outdated generator g), while the updated certificate for original signer 100 has the updated generator g' instead of g, verifier 120 may deny authenticity of a signature made by hacked proxy signer 110-$j$.

Figure 2:
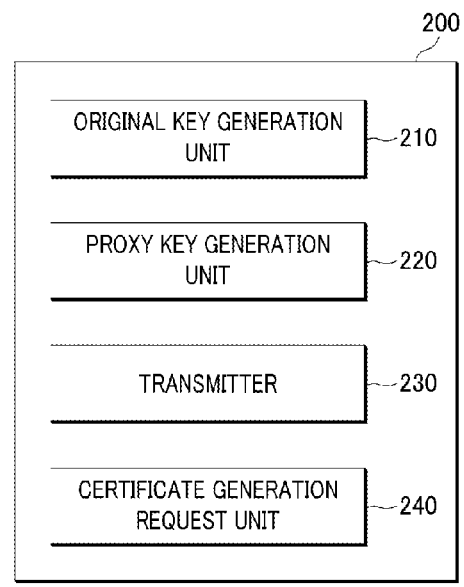
FIG. 2 shows a schematic block diagram illustrating an example architecture of a cryptographic key generation system, arranged in accordance with at least some embodiments described herein.

FIG. 2 shows a schematic block diagram illustrating an example architecture of a cryptographic key generation system 200, arranged in accordance with at least some embodiments described herein.

In some embodiments, cryptographic key generation system 200 may be a component of original signer 100. In some alternative embodiments, cryptographic key generation system 200 may be separate from original signer 100, but still be operated and/or controlled by original signer 100.

As depicted in FIG. 2, cryptographic key generation system 200 may include an original key generation unit 210, a proxy key generation unit 220, a transmitter 230 and a certificate generation request unit 240. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Original key generation unit 210 may be configured to generate a private key and a public key for original signer 100. In some embodiments, original key generation unit 210 may select two distinct random prime numbers p and q, calculate n as a product of p and q; select e as a random integer which is relatively prime to $(p-1)(q-1)$; calculate d as an integer multiplicative inverse of e, modulo $(p-1)(q-1)$; and select g as a generator of a subgroup of a finite cyclic group of order n. In such cases, (p, q, d) may be the private key for original signer 100, and (n, e, g) may be the public key for original signer 100.

Proxy key generation unit 220 may be configured to generate one or more proxy public keys and one or more proxy private keys for one or more proxy signers 110-1, 110-2, . . . , 110-$m$ based at least in part on warrants to be given respectively to proxy signers 110-1, 110-2, . . . , 110-$m$ and the generator g. For example, for proxy signer 110-$i$ among the one or more proxy signers, proxy key generation unit 220 may compute the proxy public key $e_i$ as $h(w_m, SN_i)$, in which h is a hash function, $w_m$ is the warrant to be given to proxy signer 110-$i$ (e.g., an identity of original signer 100, an identity of proxy signer 110-$i$, an expiration date until which proxy signer 110-$i$ is able to sign, and/or a qualification of message on which proxy signer 110-$i$ is able to sign, etc.), and $SN_i$ is a random serial number. If the computed $e_i$ is not a prime number, proxy key generation unit 220 may repeatedly compute the proxy public key $e_i$ with another serial number $SN_i$. Then, proxy key generation unit 220 may compute $d_i$ such that $e_i*d_i=1 \mod (p-1)(q-1)$. Then, proxy key generation unit 220 may compute the proxy private key $s_i$ as $g^{di}$.

Transmitter 230 may be configured to transmit the proxy private keys respectively to one or more proxy signers 110-1, 110-2, ..., 110-*m*. For example, transmitter 230 may transmit the proxy private key $s_i$ to proxy signer 110-*i*.

Certificate generation request unit 240 may be configured to request a certificate authority (CA) to generate a certificate for original signer 100 including the public key (n, e, g) for original signer 100. By way of example, but not limitation, the certificate for original signer 100 may include g in an extension field thereof.

In some embodiments, if proxy signer 110-*k* has been hacked, original key generation unit 210 may be configured to update the public key (n, e, g) to (n, e, g'), in which g' is another generator of the subgroup of the finite cyclic group of order n. In such cases, proxy key generation unit 220 may also be configured to update the proxy private keys respectively for proxy signers 110-1, 110-2, ..., 110-*m* except for hacked proxy signer 110-*k*, based at least in part on the updated g'. For example, for proxy signer 110-*i*, proxy key generation unit 220 may update the proxy private key $s_i$ to $s_i'=g'^{di}$. Then, transmitter 230 may transmit the updated proxy private keys respectively to proxy signers 110-1, 110-2, ..., 110-*m* except for hacked proxy signer 110-*k*, and certificate generation request unit 240 may request the certificate authority (CA) to update or change the certificate for original signer 100 so as to include g' instead of g. As such, proxy key revocation may be efficiently accomplished without an additional proxy key revocation list.

Figure 3:
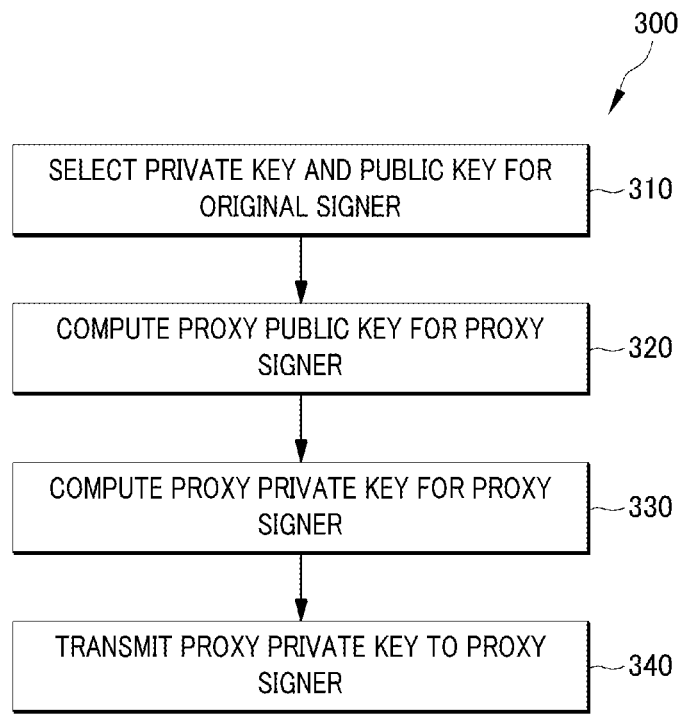
FIG. 3 shows an example flow diagram of a process for generating cryptographic keys for a proxy signature scheme, arranged in accordance with at least some embodiments described herein.

FIG. 3 shows an example flow diagram of a process 300 for generating cryptographic keys for a proxy signature scheme, arranged in accordance with at least some embodiments described herein.

The process in FIG. 3 may be implemented in a cryptographic key generation system such as cryptographic key generation system 200 including original key generation unit 210, proxy key generation unit 220, transmitter 230 and certificate generation request unit 240, described above. An example process 300 may include one or more operations, actions, or functions as illustrated by one or more blocks 310, 320, 330 and/or 340. Although illustrated as discrete blocks, various blocks may be divided into additional blocks, combined into fewer blocks, or eliminated, depending on the desired implementation. Processing may begin at block 310.

At block 310 (Select Private Key and Public Key for Original Signer), cryptographic key generation system 200 (e.g., original key generation unit 210) may select a private key and a public key for original signer 100. In some embodiments, the private key for original signer 100 may include two distinct prime numbers p and q, and the public key for original signer 100 may include a generator g of a subgroup of a finite cyclic group of an order of product n of the two distinct prime numbers p and q. Processing may continue from block 310 to block 320.

At block 320 (Compute Proxy Public Key for Proxy Signer), cryptographic key generation system 200 (e.g., proxy key generation unit 220) may compute a proxy public key for each of proxy signers 110-1, 110-2, ..., 110-*m*. In some embodiments, cryptographic key generation system 200 may compute a proxy public key for each of proxy signers 110-1, 110-2, ..., 110-*m* as a hash of a warrant to be given to each of proxy signers 110-1, 110-2, ..., 110-*m* and a random serial number for each of proxy signers 110-1, 110-2, ..., 110-*m*. Processing may continue from block 320 to block 330.

At block 330 (Compute Proxy Private Key for Proxy Signer), cryptographic key generation system 200 (e.g., proxy key generation unit 220) may compute a proxy private key for each of proxy signers 110-1, 110-2, ..., 110-*m*. In some embodiments, cryptographic key generation system 200 may compute the proxy private key for each of proxy signers 110-1, 110-2, ..., 110-*m* based at least in part on the generator g included in the public key for original signer 100 and the corresponding computed proxy public key. Processing may continue from block 330 to block 340.

At block 340 (Transmit Proxy Private Key to Proxy Signer), cryptographic key generation system 200 (e.g., transmitter 230) may transmit the computed proxy private key to each of proxy signers 110-1, 110-2, ..., 110-*m*.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
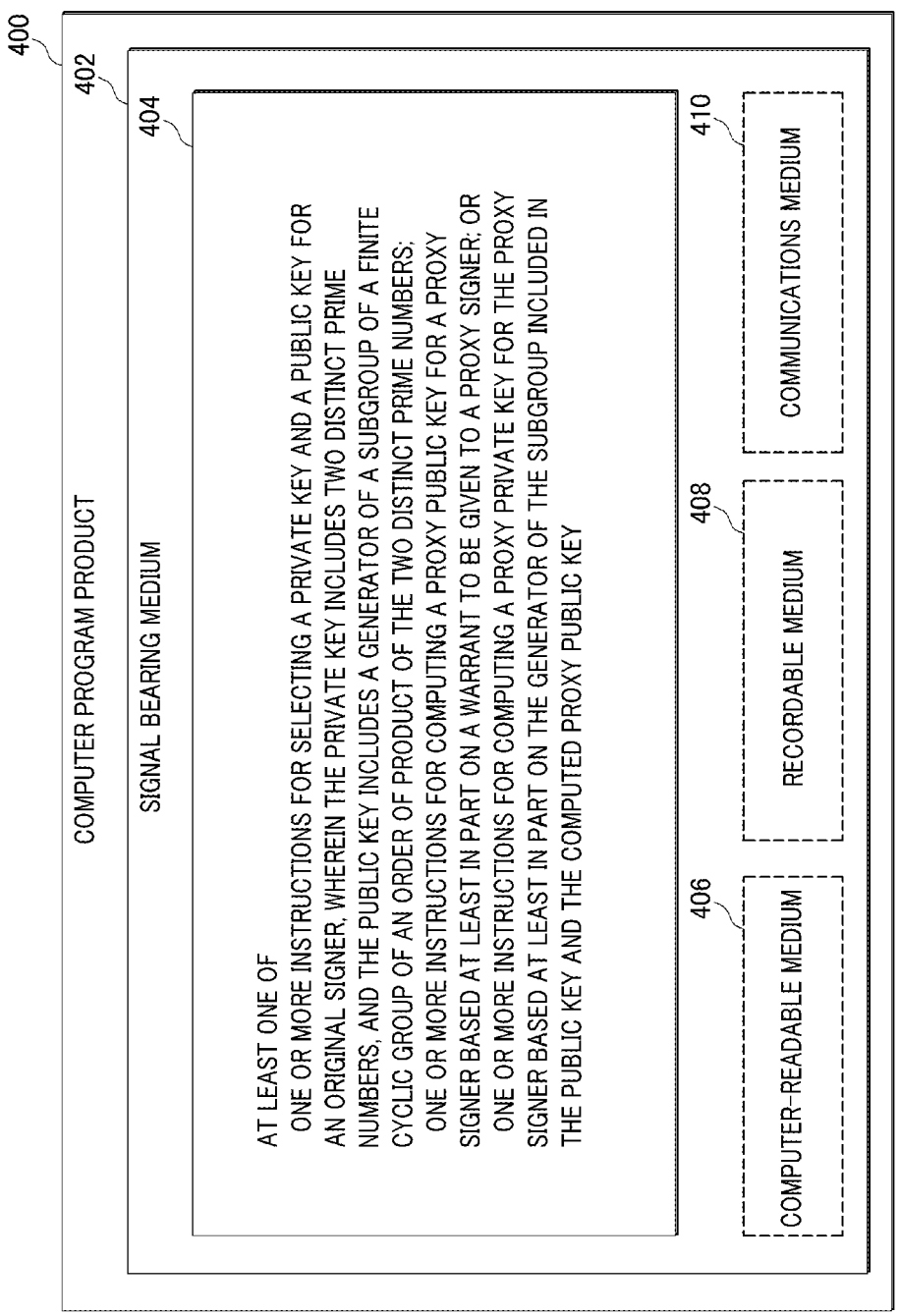
FIG. 4 illustrates an example computer program product that may be utilized to provide a proxy signature scheme for an original signer, arranged in accordance with at least some embodiments described herein.

FIG. 4 illustrates an example computer program product 400 that may be utilized to provide a proxy signature scheme for an original signer, arranged in accordance with at least some embodiments described herein.

Program product 400 may include a signal bearing medium 402. Signal bearing medium 402 may include one or more instructions 404 that, when executed by, for example, a processor, may provide the functionality described above with respect to FIGS. 1-3. By way of example, instructions 404 may include: one or more instructions for selecting a private key and a public key for an original signer, wherein the private key includes two distinct prime numbers, and the public key includes a generator of a subgroup of a finite cyclic group of an order of product of the two distinct prime numbers; one or more instructions for computing a proxy public key for a proxy signer based at least in part on a warrant to be given to a proxy signer; or one or more instructions for computing a proxy private key for the proxy signer based at least in part on the generator of the subgroup included in the public key and the computed proxy public key. Thus, for example, referring to FIG. 2, cryptographic key generation system 200 may undertake one or more of the blocks shown in FIG. 3 in response to instructions 404.

In some implementations, signal bearing medium 402 may encompass a computer-readable medium 406, such as, but not limited to, a hard disk drive, a CD, a DVD, a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, program product 400 may be conveyed to one or more modules of cryptographic key generation system 200 by an RF signal bearing medium 402, where the signal bearing medium 402 is conveyed by a wireless communications medium 410 (e.g., a wireless communications medium conforming with the IEEE 802.11 standard).

Figure 5:
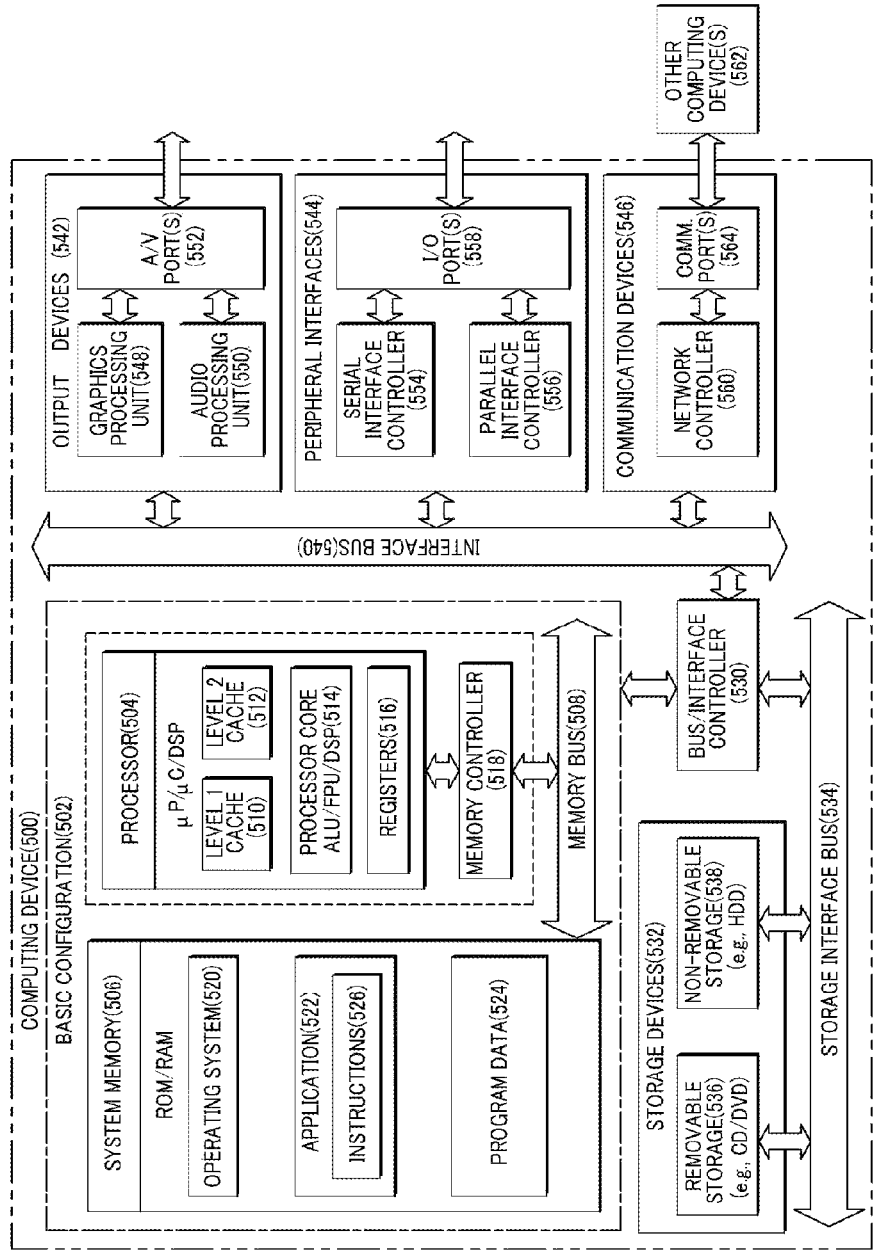
FIG. 5 is a block diagram illustrating an example computing device that may be utilized to provide a proxy signature scheme for an original signer, arranged in accordance with at least some embodiments described herein.

FIG. 5 is a block diagram illustrating an example computing device 500 that may be utilized to provide a proxy signature scheme for an original signer, arranged in accordance with at least some embodiments described herein.

In these examples, elements of computing device 500 may be arranged or configured for an electronic device. In a very basic configuration 502, computing device 500 typically includes one or more processors 504 and a system memory

506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include instructions 526 that may be arranged to perform the functions as described herein including the actions described with respect to the cryptographic key generation system 200 architecture as shown in FIG. 2 or including the actions described with respect to the flow charts shown in FIG. 3. In some examples, application 522 may be arranged to operate with program data 524 on an operating system 520 such that implementations for instructions for a computing system as described herein.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A cryptographic key generation system, comprising:
   a memory;
   at least one processor;
   an instruction module executable by the at least one processor, the instruction module providing instructions that when executed by the at least one processor cause the at least one processor to perform operations, comprising:
   generating a public key and a private key for an original signer, the private key including two distinct prime numbers, and the public key including a generator of a subgroup of a finite cyclic group of an order of product of the two distinct prime numbers, and
   generating one or more proxy public keys and one or more proxy private keys for one or more proxy signers, based at least in part on warrants to be given respectively to the one or more proxy signers and the generator of the subgroup included in the public key generated by the original key generation unit,
   wherein the generating one or more proxy public keys includes generating, for a respective one of the proxy signers, the proxy public key as a hash of the warrant to be given to the respective one of the proxy signers and a random serial number for the respective one of the proxy signers, and the warrant to be given varies depending on the respective one of the proxy signers; and
   a transmitter configured to transmit the proxy private keys respectively to the one or more proxy signers,
   wherein the cryptographic key generation system is controllable by the original signer, and the original signer is a computing device that delegates its signing capability to the proxy signer which is a proxy server device.

2. The cryptographic key generation system of claim 1, wherein the warrant to be given to the respective one of the proxy signers includes at least one of an identity of the original signer, an identity of the respective one of the proxy signers, an expiration date until which the respective one of the proxy signers is able to sign, and a qualification of message on which the respective one of the proxy signers is able to sign.

3. The cryptographic key generation system of claim 1, wherein the private key for the original signer includes (p, q, d) and the public key for the original signer includes (n, e, g), wherein p and q are the distinct prime numbers, n is the product of p and q, e is a random integer which is relatively prime to $(p-1)(q-1)$, d is an integer multiplicative inverse of e, modulo $(p-1)(q-1)$, and g is the generator of the subgroup of the finite cyclic group of order n.

4. The cryptographic key generation system of claim 3, wherein the operations further comprise updating the public key by substituting g with g', wherein g' is another generator of a subgroup of a finite cyclic group of order n, when at least one of the one or more proxy signers is hacked.

5. The cryptographic key generation system of claim 4, wherein the operations further comprise updating the proxy private keys respectively for the one or more proxy signers except for the hacked one of the proxy signers based at least in part on the updated g', and wherein the transmitter is further configured to transmit the updated proxy private keys respectively to the one or more proxy signers except for the hacked one of the proxy signers.

6. The cryptographic key generation system of claim 3, further comprising:
a certificate generation request unit configured to request a certificate authority to generate a certificate including the public key for the original signer.

7. The cryptographic key generation system of claim 6, wherein the certificate includes g in an extension field thereof.

8. The cryptographic key generation system of claim 3, wherein the operations further comprise selecting g to be no less than 160 bits, when n is 2048 bits.

9. A method performed under control of an original signer for a proxy signer to sign on behalf of the original signer, comprising:
selecting, by the original signer, a private key and a public key for the original signer, wherein the private key includes two distinct prime numbers, and the public key includes a generator of a subgroup of a finite cyclic group of an order of product of the two distinct prime numbers;
computing, by the original signer, a proxy public key for the proxy signer based at least in part on a warrant to be given to the proxy signer, wherein the computing of the proxy public key includes computing the proxy public key as a hash of the warrant to be given to the proxy signer and a random serial number for the proxy signer, and the warrant to be given varies depending on the proxy signer;
computing, by the original signer, a proxy private key for the proxy signer based at least in part on the generator of the subgroup included in the public key and the computed proxy public key; and
transmitting, by the original signer, the computed proxy private key to the proxy signer, wherein the original signer is a computing device that delegates its signing capability to the proxy signer which is a proxy server device.

10. The method of claim 9, wherein the warrant to be given to the proxy signer includes at least one of an identity of the original signer, an identity of the proxy signer, an expiration date until which the proxy signer is able to sign, and a qualification of message on which the proxy signer is able to sign.

11. The method of claim 9, further comprising:
requesting a certificate authority to generate a certificate of the original signer including the selected public key.

12. The method of claim 9, further comprising:
updating the public key by substituting the generator of the subgroup with another generator of the subgroup;
updating the proxy private key for the proxy signer based at least in part on the updated generator of the subgroup; and
transmitting the updated proxy private key to the proxy signer.

13. The method of claim 12, further comprising:
requesting a certificate authority to update a certificate of the original signer based at least in part on the updated generator of the subgroup.

14. A non-transitory computer-readable storage medium having stored thereon computer-executable instructions that, in response to execution, cause a cryptographic key generation system to perform operations, comprising:
selecting, by an original signer, a private key and a public key for the original signer, wherein the private key includes two distinct prime numbers, and the public key includes a generator of a subgroup of a finite cyclic group of an order of product of the two distinct prime numbers;
computing, by the original signer, a proxy public key for a proxy signer based at least in part on a warrant to be given to a proxy signer, wherein the computing of the proxy public key includes computing the proxy public key as a hash of the warrant to be given to the proxy signer and a random serial number for the proxy signer, and the warrant to be given varies depending on the proxy signer; and
computing, by the original signer, a proxy private key for the proxy signer based at least in part on the generator of the subgroup included in the public key and the computed proxy public key, wherein the original signer is a computing device that delegates its signing capability to the proxy signer which is a proxy server device.

15. The computer-readable storage medium of claim 14, wherein the operations further comprise: transmitting the computed proxy private key to the proxy signer for the proxy signer to sign on behalf of the original signer.

16. The computer-readable storage medium of claim 14, wherein the operations further comprise: requesting a certificate authority to generate a certificate including the public key for the original signer.

17. The computer-readable storage medium of claim 14, wherein the warrant to be given to the proxy signer includes at least one of an identity of the original signer, an identity of the proxy signer, an expiration date until which the proxy signer is able to sign, and a qualification of message on which the proxy signer is able to sign, and wherein the expiration date and the qualification vary depending on the proxy signer.

* * * * *